(12) United States Patent
Tanae (10) Patent No.: US 8,145,192 B2
(45) Date of Patent: Mar. 27, 2012

(54) MOBILE TERMINAL APPARATUS AND METHOD FOR CONTROLLING ALERT OPERATION THEREOF

(75) Inventor: Hiroshi Tanae, Kanagawa (JP)

(73) Assignee: Panasonic Corporation, Osaka (JP)

( * ) Notice: Subject to any disclaimer, the term of this patent is extended or adjusted under 35 U.S.C. 154(b) by 326 days.

(21) Appl. No.: 11/577,873

(22) PCT Filed: May 1, 2006

(86) PCT No.: PCT/JP2006/309092
§ 371 (c)(1),
(2), (4) Date: Apr. 25, 2007

(87) PCT Pub. No.: WO2007/004352
PCT Pub. Date: Nov. 1, 2007

(65) Prior Publication Data
US 2009/0124296 A1 May 14, 2009

(30) Foreign Application Priority Data

Jun. 30, 2005 (JP) ................. 2005-192260

(51) Int. Cl.
*H04M 1/66* (2006.01)
(52) U.S. Cl. .................. 455/411; 455/412.1; 455/41.2; 455/41.3; 455/456.3
(58) Field of Classification Search ............ 455/411, 455/412.1, 41.2, 41.3, 456.3
See application file for complete search history.

(56) References Cited

U.S. PATENT DOCUMENTS 5,771,287 A * 6/1998 Gilley et al. .................. 713/191
7,228,142 B2 * 6/2007 Natori et al. ............... 455/456.3
2001/0007817 A1   7/2001 Odagiri et al.
2002/0115478 A1 * 8/2002 Fujisawa et al. ............. 455/567
2007/0037605 A1 * 2/2007 Logan .......................... 455/567

FOREIGN PATENT DOCUMENTS

| JP | 05-037660 A | 2/1993 |
| JP | 10-243059 A | 9/1998 |
| JP | 11-018147 | 1/1999 |
| JP | 11-088499 | 3/1999 |
| JP | 2000-174892 A | 6/2000 |
| JP | 2001-197195 A | 7/2001 |
| JP | 2002-164963 | 6/2002 |
| JP | 2005-341187 | 12/2005 |
| JP | 2006-109326 | 4/2006 |

* cited by examiner

OTHER PUBLICATIONS

International Search Report (PCT/JP2006/309092) dated Jul. 18, 2006.

*Primary Examiner* — Charles Shedrick
(74) *Attorney, Agent, or Firm* — Pearne & Gordon LLP (57) ABSTRACT

There are provided a portable terminal device capable of preventing influence on the surroundings and leakage of personal information without impairing convenience and its incoming call notifying operation controlling method. A portable terminal device (1) executes radio authentication between itself and a radio communicating unit (3). The portable terminal device (1) includes a radio communicating unit for conducting communication with a base station device; an incoming call notifying unit for executing an incoming call notification when an incoming call is detected by the radio communicating unit; an incoming call operation controlling unit for controlling the operation of the incoming call notifying unit; and a radio authenticating unit for conducting radio communication with the radio communicating unit (3) and authentication according to whether or not the distance to the radio communicating unit is within a predetermined distance. The incoming call operation controlling unit controls the operation of the incoming call notifying unit by an incoming call notifying method according to the distance to the radio communicating unit (3).

5 Claims, 5 Drawing Sheets

MOBILE TERMINAL APPARATUS AND METHOD FOR CONTROLLING ALERT OPERATION THEREOF

TECHNICAL FIELD

This invention relates to a portable terminal device and a method for controlling an incoming call notifying operation thereof.

BACKGROUND ART

Conventionally, for the purpose of preventing various devices such as a cellular phone from being used without permission owing to leaving it behind, robbery, etc. there is a use-limiting device in which the calling function of the cellular phone is limited at a position apart by a predetermined distance or further from the owner of the cellular phone.

In this use-limiting device, transmission/reception of an identification code is carried out between an identification signal transmitting unit carried by the owner of the cellular phone and a use-limitation releasing unit incorporated in the cellular phone, and when both units are apart from each other by a predetermined distance or further, the releasing unit stops the releasing signal of the use limitation of the cellular phone (see Patent Reference 1).

Patent Reference 1: JP-A-11-88499

DISCLOSURE OF THE INVENTION

However, the above cellular phone limits the calling function of the cellular phone when the cellular phone is separated from the owner but does not take the limitation of an incoming call notifying operation in consideration. Generally, the portable terminal device such as the cellular phone performs the incoming call notifying operation on the basis of the operation set previously by a user. Therefore, even when the cellular phone is separated by a predetermined distance or further from the owner, for example the owner leaves the portable terminal device, if there is an incoming call, ringtone or vibrating beep rings, and so others around the portable terminal device are annoyed.

Further, it is possible to display the phone number and/or name of a sender and to display a part of the contents in mail arrival on a screen (sub-screen) visible from the outside as an incoming call notifying operation. Such a function is convenient for the owner, but in the absence of the owner, there is a possibility of private information being seen by others.

This invention has been accomplished in view of the above circumstances. An object of this invention is to provide a portable terminal device capable of preventing influence on the surroundings and leakage of personal information without impairing convenience and a method for controlling an incoming call notifying operation thereof.

MEANS FOR SOLVING THE PROBLEMS

As a first item, this invention provides a portable terminal device comprising: a radio communicating unit which performs radio communication with a base station device, an incoming call notifying unit which executes an incoming call notification when an incoming call is detected by the radio communicating unit, an incoming call notifying operation controlling unit which controls operation of the incoming call notifying unit, and a radio authenticating unit which conducts radio communication with a radio communicating unit and conducts authentication for the radio communicating unit. The incoming call notifying operation controlling unit controls the operation of the incoming call notifying unit by an incoming call notifying process based on whether or not the authentication for the radio communicating unit is established.

In accordance with this configuration, since the incoming call notifying process is controlled according to whether or not the authentication for the radio communicating unit is established, for example, different incoming call notifying operations are carried out for the state in which the owner is close to the portable terminal device and the absent state in which the owner is separated from the portable terminal device. Accordingly, without impairing convenience, the incoming call notifying operation preventing influence on the surroundings and leakage of personal information can be performed.

As a second item, this invention provides the portable terminal device according to the first item, wherein the incoming call notifying operation controlling unit does not execute incoming call notification by the incoming call notifying unit for the incoming call detected when the authentication for the radio communicating unit is not established.

In accordance with this configuration, in the state where the owner is absent, for example, although the calling operation by a sender or the incoming call operation for the sender via the base station such as receiving absence message after a prescribed number of callings in response to the calling operation is carried out, the incoming call notifying operation is not carried out. Thus, the incoming call notifying operation preventing influence on the surroundings and leakage of personal information can be performed.

As a third item, this invention provides the portable terminal device according to the second item, wherein the incoming call notifying operation controlling unit includes a storage unit which stores, as non-notified incoming call information, information on the incoming call which is detected when the authentication for the radio communicating unit is not established and for which the incoming call notification is not executed by the incoming call notifying unit.

In accordance with this configuration, the incoming call for which the incoming call notifying operation has not performed can be stored.

As a fourth item, this invention provides the portable terminal device according to the third item, wherein when the authentication for the radio communicating unit is shifted from a state of non-establishment of the authentication to a state of establishment of the authentication, the incoming call notifying operation controlling unit performs the incoming call notification by the incoming call notifying unit on the basis of the non-notified incoming call information stored in the storage unit.

In accordance with this configuration, the information on the incoming call for which the incoming call notifying operation has not been performed because the owner is absent can be swiftly notified when the owner has approached the portable terminal device.

As a fifth item, this invention provides the portable terminal device according to the third or fourth item, wherein when the authentication for the radio communicating unit is shifted from a state of non-establishment of the authentication to a state of establishment of the authentication, the incoming call notifying operation controlling unit transmits the non-notified incoming call information stored in the storage unit to the radio communicating unit through the radio authenticating unit.

In accordance with this configuration, the radio communicating unit, when the owner approaches the portable terminal device, can acquire the information on the incoming call for which the incoming call notifying operation has not been performed because the owner is absent. For example, this incoming call is notified by the radio communicating unit and so notified swiftly at a position near the owner. For example, in the case of the notification (notification by the silent mode) such as driving the vibrating motor without generating sound, the radio communicating unit being carried on the clothes can more surely notify the owner of the incoming call than the portable terminal device being left and not carried does.

As a sixth item, this invention provides the portable terminal device according to the first item, wherein the incoming call notifying operation controlling unit executes the incoming call notification with a setting (default setting) previously installed in the incoming call notifying unit for the incoming call detected when the authentication for the radio communicating unit is not established.

In accordance with this configuration, for example, where the owner is separated from the portable terminal device, the incoming call notification is performed by, for example, the ringtone with the setting (default setting) previously installed, but not done by, for example, the ringtone personally set. By such an incoming call notification, it is possible to prevent the personal information of preference of the incoming call notification, for example, such as the ringtone personally set from being known to others.

As a seventh item, this invention provides a portable terminal device comprising: a radio communicating unit which performs radio communication with a base station device, an incoming call notifying unit which executes an incoming call notification when an incoming call is detected by the radio communicating unit, an incoming call notifying operation controlling unit which controls operation of the incoming call notifying unit, and a radio authenticating unit which conducts radio communication with a radio communicating unit and conducts authentication for the radio communication unit in accordance with whether or not the distance to the radio communicating unit is within a predetermined distance, wherein the incoming call notifying operation controlling unit controls the operation of the incoming call notifying unit by an incoming call notifying process based on the distance to the radio communicating unit.

In accordance with this configuration, since the incoming call notifying method is controlled according to the distance from the radio communicating unit, by performing different incoming call notifying operations for the state where the owner is close to the portable terminal device and the absent state where the owner is separated from the portable terminal device, without impairing convenience, the incoming call notifying operation preventing influence on the surroundings and leakage of personal information can be performed.

As an eighth item, this invention provides the portable terminal device according to the seventh item, wherein the incoming call notifying operation controlling unit executes the incoming call notification with the setting (default setting) previously installed in the incoming call notifying unit for the incoming call detected when the distance to the radio communicating unit is equal to or further than the predetermined distance.

In accordance with this configuration, for example, where the owner is separated from the portable terminal device, the incoming call notification is executed by, for example, the ringtone with the setting (default setting) previously installed, but not done by, for example, the ringtone personally set. By such an incoming call notification, it is possible to prevent the personal information of preference of the incoming call notifying, for example, such as the ringtone personally set from being known to others.

As a ninth item, this invention provides a method for controlling an incoming call notifying operation for a portable terminal device, comprising: conducting radio communication with a radio communicating unit and authentication for the radio communication, conducting communication with a base station device, and executing an incoming call notification by an incoming call notifying process based on whether or not the authentication for the radio communicating unit is established when an incoming call from the base station device is detected.

In accordance with this method, since the incoming call notifying method is controlled according to the distance from the radio communicating unit, by carrying out different incoming call notifying operations for the state where the owner is close to the portable terminal device and the absent state where the owner is separated from the portable terminal device, without impairing convenience, the incoming call notifying operation preventing influence on the surroundings and leakage of personal information can be performed.

As a tenth item, this invention provides the method for controlling an incoming call notifying operation for a portable terminal device according to the ninth item, wherein the incoming call notifying process based on whether or not the authentication for the radio communicating unit is established is a process for executing an incoming call notification with a setting (default setting) previously installed for the incoming call detected when the authentication for the radio communicating unit is not established.

In accordance with this configuration, for example, where the owner is separated from the portable terminal device, the incoming call notification is executed by, for example, the ringtone with the setting (default setting) previously installed, but not done by, for example, the ringtone personally set. By such an incoming call notification, it is possible to prevent the personal information of preference of the incoming call notification, for example, such as the ringtone personally set from being known to others.

As an eleventh item, this invention provides a method for controlling an incoming call notifying operation for a portable terminal device, comprising: conducting radio communication with a radio communicating unit and authentication in accordance with whether or not the distance to the radio communicating unit is within a predetermined distance, conducting radio communication with a base station device, and executing an incoming call notification by an incoming call notifying process based on the distance to the radio communicating unit when the incoming call from the base station device is detected.

In accordance with this method, since the incoming call notifying method is controlled according to the distance from the radio communicating unit, by carrying out different incoming call notifying operations for the state where the owner is close to the portable terminal device and the absent state where the owner is separated from the portable terminal device, without impairing convenience, the incoming call notifying operation preventing influence on the surroundings and leakage of personal information can be performed.

As a twelfth item, this invention provides the method for controlling the incoming call notifying operation for a portable terminal device according to the eleventh item, wherein the incoming call notifying process based on the distance to the radio communicating unit is a process for executing an incoming call notification with a setting (default setting) previously installed for the incoming call detected when the distance to the radio communicating unit is equal to or further than the predetermined distance.

In accordance with this method, for example, where the owner is separated from the portable terminal device, the incoming call notification is done by, for example, the ringtone with the setting (default setting) previously installed, but not done by, for example, the ringtone personally set. By such an incoming call notification, it is possible to prevent the personal information of preference of the incoming call notifying, for example, such as the ringtone personally set from being known to others.

ADVANTAGE OF THE INVENTION

In accordance with this invention, without impairing convenience, there can be provided a portable terminal device capable of preventing influence on the surroundings and leakage of personal information and its method for controlling an incoming call notifying operation.

DESCRIPTION OF REFERENCE NUMERALS AND SIGNS

1 portable terminal device
2 base station
3 radio communicating unit
11 cellular radio unit
12 data processing unit
13, 33 radio authenticating unit
14 incoming call operation controlling unit
15, 35 notifying unit
16, 36 manipulating unit
34 notifying operation controlling unit
131, 331 storage unit
132, 332 radio unit
133, 333 determining unit
134, 334 data communicating unit
141 storage unit
142 incoming call operation instructing unit
151, 351 screen display
152, 352 speaker
153, 353 vibrating motor
154, 354 LED display

BEST MODE OF CARRYING OUT THE INVENTION

FIG. 1 is a view for explaining an incoming call notifying operation controlling method for the portable terminal device according to an embodiment of this invention. As shown in FIG. 1, a portable terminal device 1 performs radio authentication between itself and a radio communicating unit 3. If the distance to the radio communicating unit 3 is within an authentication distance, the authentication is established. If it is further than the authentication distance, the authentication is not established (non-identified). The communicating device for this radio authentication may be a communicating device using weak radio waves or close-range communicating device (communicating distance is within for example, several meters).

There are several methods for the radio authentication. For example, a radio communicating unit 3 transmits its ID and a portable communicating device 1 receives it. In this case, if the received ID agrees with the ID of the radio communicating unit 3 stored in the portable terminal device 1, the authentication on the side of the portable terminal device 1 is established. Likewise, the portable terminal device 1 transmits its ID and the radio communicating unit 3 receives it. In this case, if the received ID agrees with the ID of the portable terminal device 1 stored in the radio communicating unit 3, the authentication on the side of the radio communicating unit 3 is established. In case where the communicating unit using weak radio waves or close-range communicating unit (communicating distance is within for example, several meters) is employed as the communicating unit for the radio authentication, if both are separated equal to or further than a predetermined distance so that the strength of each the received signals is equal to or lower than a prescribed value, the ID cannot be confirmed. Thus, the authentication is not established. Inversely, if both are separated within a predetermined distance, the authentication is established.

Another example of the radio authentication is as follows. First, for example, the radio communicating unit 3 transmits its ID and the portable communicating device 1 receives it. In this case, if the received ID agrees with the ID of the radio communicating unit 3 stored in the portable terminal device 1, the portable terminal device 1 transmits a signal containing random numbers (challenge signal) and the radio communicating unit 3 receives it. Next, the radio communicating unit 3 transmits a signal containing the received random numbers encrypted with a common key (response signal), and the portable terminal device 1 receives it. Next, using the common key, the portable terminal device 1 inversely decodes the random numbers encrypted with the common key. In this case, if the decoded result agrees with the random numbers transmitted by the portable terminal device 1 itself, the authentication on the side of the portable terminal device 1 can be established. Next, if the authentication has been established on the side of the portable terminal device 1, the portable terminal device 1 transmits its ID, and the radio communicating unit 3 receives it. In this case, if the received ID agrees with the ID of the portable terminal device 1 stored in the radio communicating unit 3, the authentication on the side of the radio communicating unit 3 can be established. Incidentally, it is assumed that the portable terminal device 1 and radio communicating unit 3 store the same common key. In case the communicating unit using weak radio waves or close-range communicating unit (communicating distance is within for example, several meters) is used as the communicating unit for the radio authentication, if both are separated equal to or further than a predetermined distance so that the strength of each the received signals is equal to or lower than a prescribed value, authentication is not established. Inversely, if both are separated within a predetermined distance, authentication is established.

Still another method for radio authentication is as follows. Using both the IDs, the challenge signal and the response signal as described above, if the strength of the signal received by the portable terminal device 1 is equal to or higher than a prescribed strength (or higher than the prescribed strength) (i.e., within a prescribed distance), the ID received by the portable terminal device 1 agrees with the ID of the radio communicating unit 3 stored in the portable terminal device 1, and the decoded result of the random numbers contained in the response signal agrees with the random numbers contained in the challenge signal transmitted by itself, authentication on the side of the portable terminal device 1 can be established. Likewise, if the strength of the signal received by the radio communicating unit 3 is equal to or higher than a prescribed strength (or higher than the prescribed strength) (i.e., within a prescribed distance), the ID received by the radio communicating unit 3 agrees with the ID of the portable terminal device 1 stored in the radio communicating unit 3, the authentication on the side of the radio communicating unit 3 can be established. In case the communicating unit using weak radio waves or close-range communicating unit (communicating distance is within for example, several meters) is used as the communicating unit for the radio authentication, if both are separated equal to or further than a predetermined distance so that the strength of each the received signals is equal to or lower than a prescribed value, authentication is not established. Inversely, if both are separated within a predetermined distance, authentication is established.

Figure 1A:
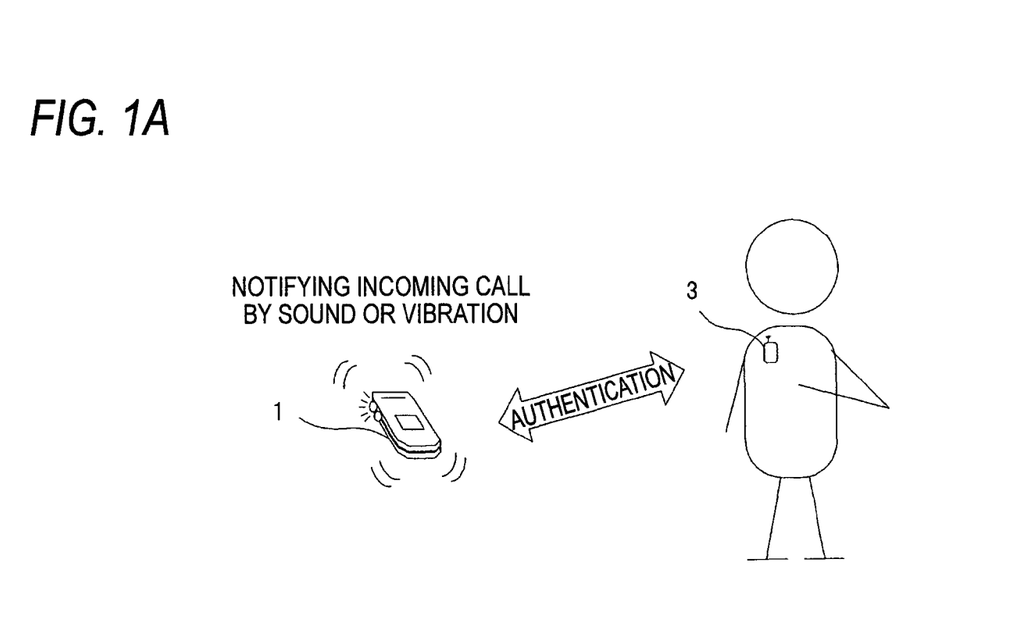
FIG. 1 is a view for explaining an incoming call notifying operation controlling method for the portable terminal device according to an embodiment of this invention.
Figure 1B:
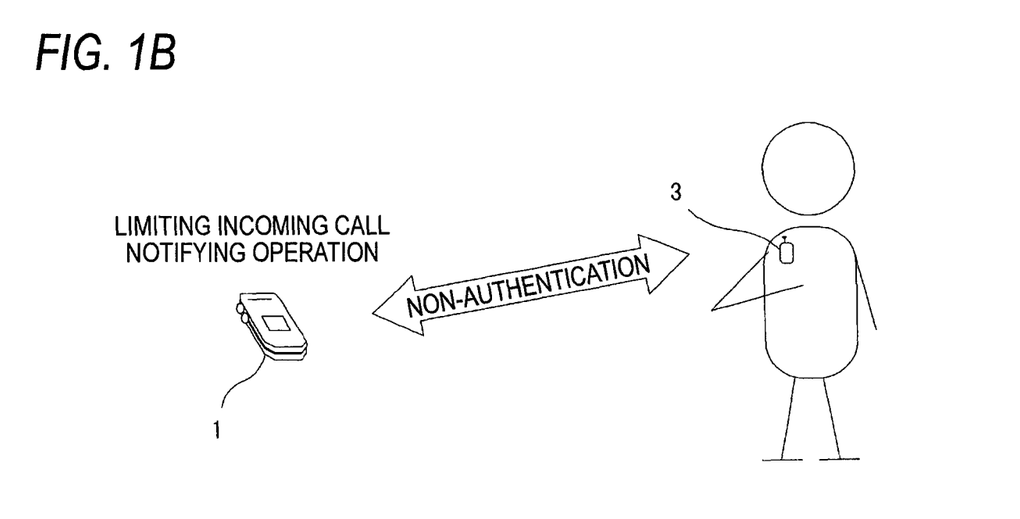

The portable terminal device 1 according to this embodiment, in the state where the authentication has been established as shown in FIG. 1(A), gives a notice of arrival of speech or mail by e.g. sound or vibration, and in the state where authentication is not established as shown in FIG. 1(B), limits an incoming call notifying operation. Thus, different incoming call notifying operations are carried out for the state where the owner is close to the portable terminal device and the absent state where the owner is separated from the portable terminal device. Accordingly, without impairing convenience, the incoming call notifying operation preventing influence on the surroundings and leakage of personal information can be performed.

Figure 2:
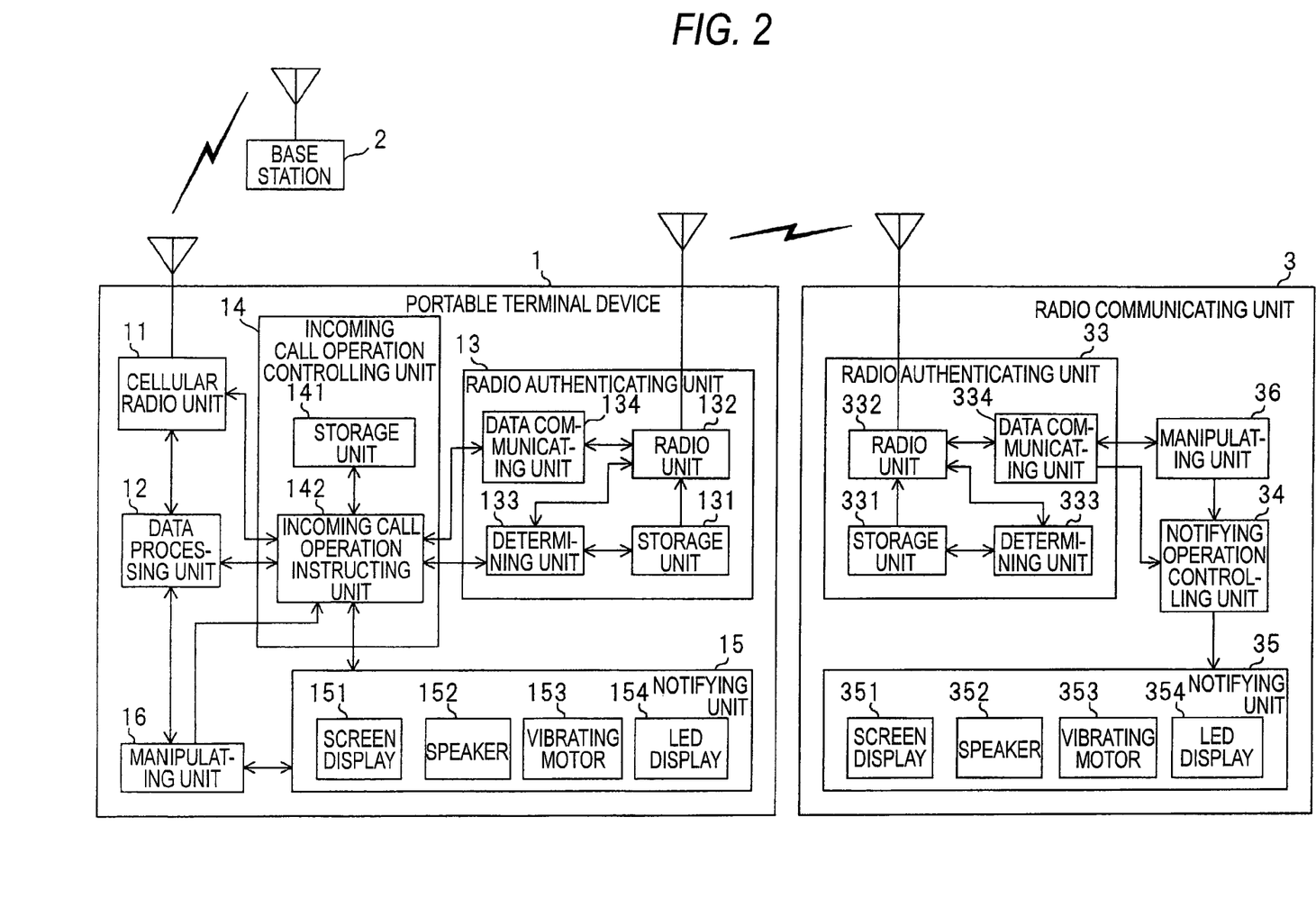
FIG. 2 is a block diagram showing the main configuration of the portable terminal device according to an embodiment of this invention.

FIG. 2 is a block diagram of the main configuration of the portable terminal device according to an embodiment of this invention. In this embodiment, it is assumed that the portable terminal device 1 has a cellular communicating function capable of being connected to a cellular communicating network while communicating with a base station 2. However, the portable terminal device having various communicating functions not limited to the cellular communicating function may be employed.

As shown in FIG. 2, the portable terminal device 1 includes a cellular radio unit 11, a data processing unit 12, a radio authentication unit 13, an incoming call operation controlling unit 14, a notifying unit 15 and a manipulating unit 16.

The cellular radio unit 11, which operates as an example of the radio communicating unit, conducts radio communication with the base station 2. The data processing unit 12 performs the data processing of the function of the portable terminal device 1 such as electronic banking function or data referring function as well as processing of the data transmitted/received in the cellular radio unit 11. For example, when an incoming call (incoming-call or arrival) is detected, the data processing unit 12 sends, to the incoming call operation controlling unit 14, the arrival information including a telephone number or a mail address of a sender, and/or name of the sender referring to a telephone directory in which the sender is previously registered. The radio authenticating unit 13, which operates as an example of the radio authenticating unit, detects the distance to the radio communicating unit 3 and executes authentication according to whether or not the distance to the radio communicating unit 3 is within a predetermined distance.

The incoming call operation controlling unit 14 controls the incoming call operation when the incoming call is received via the base station, for example, waits an manipulating input during a predetermined calling period in response to the calling from the sender, or receives the notice of reception of a part or all of mails or arrival of the mail at a server. Further, the incoming call operation controlling unit 14, which operates as an example of the incoming call notifying operation controlling unit, controls the incoming call notifying operation by limiting the operation of the notifying unit 15 by a notification method depending on the distance to the radio communicating unit 3. The notifying unit 15 operates as an example of the incoming call notifying unit. When the notifying unit 15 detects the incoming call from the base station 2 through the cellular radio unit 11, it executes the incoming call notification based on the instruction from the incoming call operation controlling unit 14. The manipulating unit 16 receives the manipulating input from, for example, a user or supplies a manipulating signal to the data processing unit 12, incoming call operation controlling unit 14, and notice giving unit 15.

The radio authenticating unit 13 includes a storage unit 131, a radio unit 132, a determining unit 133 and a data communicating unit 134. The storage unit 131 stores an ID for authentication such as an identification code used in performing radio-authentication for the radio communicating unit 3. Incidentally, the ID for authentication is an ID previously correlated, for example, between the portable terminal device 1 and the radio communicating unit 3 and always permits the authentication by confirming that they constitute a pair through the radio communication.

The radio unit 132, which performs the radio communication between itself and the radio communicating unit 3, transmits the ID for authentication stored in the storage unit 131 to the radio communicating unit 3 and receives a radio signal from the radio communicating unit 3.

The determining unit 133 decodes the received signal from the radio communicating unit 3, received by the radio unit 132, analyzes the ID and also detects the distance to the radio communicating unit 3 based on e.g. the signal level of the received signal or error rate. Further, if the received ID agrees with the ID for authentication referring to the storage unit 131 and also the distance to the radio communicating unit 3 is within a predetermined distance (authenticating distance), the determining unit 133 determines that the authentication has been established, and in the other cases determines that the authentication has not been established. As the result of authentication, the determining unit 133 supplies an authentication flag (e.g. "0" when the authentication has been established and "1" when the authentication has not been established) and outputs to the incoming call operation controlling unit 14.

The data communicating unit 134 performs the data communication with the radio communicating unit 3 through the radio unit 132. For example, the data communicating unit 134 performs an ID exchange for the radio authentication in the radio unit 132 at predetermined periods and performs the data communication with the radio communicating unit 3 in the intervals of the radio authentication under the rule determined between itself and the radio communicating unit 3, thereby performing a small capacity of data communication.

The incoming call operation controlling unit 14 includes a storage unit 141 and an incoming call operation instructing unit 142. The storage unit 141, which operates as an example of the storage unit, stores the settings of the incoming call operation and incoming call notifying operation. For example, the storage unit 141 stores the incoming call notifying operation when the authentication has been established by the radio authenticating unit 13 and the incoming call notifying operation when the authentication has not been established. The incoming call operating instructing unit 142, when the incoming call is detected through the cellular radio unit 11, referring to the storage unit 141, controls the incoming call notifying operation of the notifying unit 15 by the incoming call notifying method on the basis of the determination of authentication by the determining unit 133 of the radio authenticating unit 13.

The notifying unit 15 includes a screen display 151 capable of displaying desired information (such as sender information when the incoming call is received) and having a sub-screen provided at a position viewable from the outside; a speaker 152 which produces the sound such as ringtone with a desired volume; a vibrating motor 153 which vibrates with a desired vibration pattern and an LED display, for example an LED, 154 which lights or blinks the lamp. Based on the instructions from the incoming call operation instructing unit 142, the screen display 151, speaker 152, vibrating motor 153 and LED display 154 perform the operations corresponding to the instructions, respectively.

The radio communicating unit 3 includes an radio authenticating unit 33, an notifying operation controlling unit 34, an notifying unit 35 and a manipulating unit 36.

The radio authenticating unit 33, which has the same configuration as the radio authenticating unit 13, performs the radio authentication for the portable terminal device 1. The radio authenticating unit 33 includes a storage unit 331, a radio unit 332, a determining unit 333 and a data communicating unit 334 which correspond to the storage unit 131, radio unit 132, determining unit 133 and data communicating unit 134 in the radio authenticating unit 13 of the portable terminal device 1, respectively.

The notifying operation controlling unit 34 controls the operation of the notifying unit 35 based on the instruction from the data communicating unit 334 in the radio authenticating unit 33. Like the notifying unit 15, the notifying unit 35 includes a screen display 351, a speaker 352, a vibrating motor 353 and an LED display 354. The manipulating unit 36 receives a manipulating input from a user and supplies the manipulating signal to the data communicating unit 33 and notifying operation controlling unit 34.

Hereinafter, an explanation will be given of an example of the incoming call notifying operation according to an embodiment of this invention. It should be noted that setting of the incoming call operation is stored as setting information in the storage unit 141 of the incoming call operation controlling unit 14.

Figure 3:
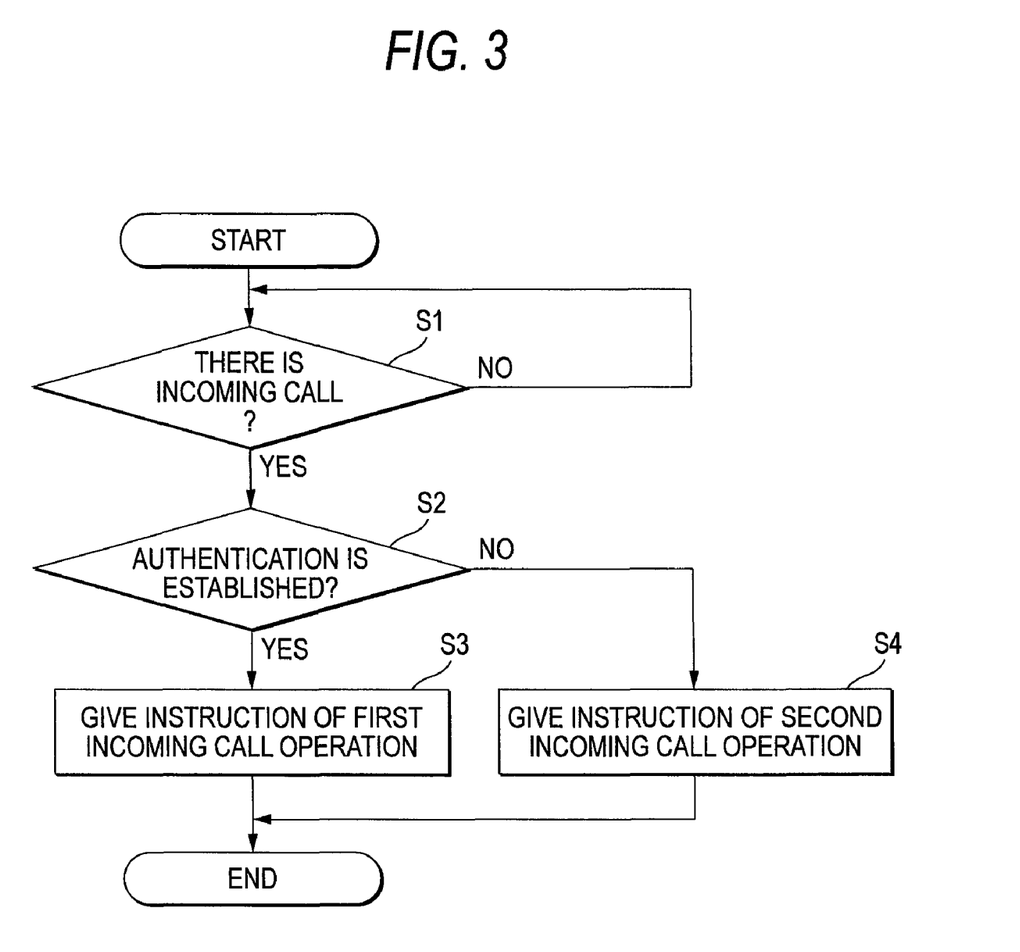
FIG. 3 is a flowchart showing a first example of the operating procedure of the portable terminal device according to an embodiment of this invention.

FIG. 3 is a flowchart showing a first example of the operating procedure of the portable terminal device according to an embodiment of this invention. As seen from FIG. 3, the incoming call operation instructing unit 142 monitors whether or not there is an incoming call (Step S1). If the incoming call is detected (YES in step S1), the incoming call operation instructing unit 142 refers to the result of the radio authentication by the determining unit 133 (step S2). If the authentication has been established (YES in step S2), referring to the setting information stored in the storage unit 141, the incoming call operation instructing unit 142 gives an instruction of the incoming call notifying operation for times when the authentication has been established (first incoming call notifying operation) to the notifying unit 15. The notifying unit 15 performs the incoming call notifying operation based on the instruction (step S3). On the other hand, if the authentication has not been established (NO in step S2), referring to the setting information stored in the storage unit 141, the incoming call operation instructing unit 142 gives an instruction of the incoming call notifying operation for times when the authentication has not been established (second incoming call notifying operation) to the notifying unit 15. The notifying unit 15 performs the incoming call notifying operation based on the instruction (step S4). If there is an incoming call, if there is a calling from a sender, the notifying unit 15 performs the incoming call notifying operation, and the calling is notified to the owner. The owner, after having received the incoming call notifying operation, depresses a speech button to start speech or open/read a mail. In this way, in the state where the owner is absent, for example, although a calling operation from the sender and a receiving operation between the sender via a base station such as receiving absence message after a prescribed number of callings in response to the calling operation are carried out, by controlling the incoming call notifying operation, the incoming call notifying operation preventing influence on the surroundings and leakage of personal information can be carried out.

In this way, for example, by setting the second incoming call notifying operation so that any of the screen display 151, speaker 152, vibrating motor 153 and LED display 154 is not operated, it is possible to prevent a third person from knowing that there has been a calling while in the state when the owner was absent, nor the information of the sender. Further, by omitting the incoming call notifying operation when the owner is absent, power consumption can be suppressed.

Further, by setting the second incoming call notifying operation so that the LED display 154 only emits light, the incoming call notification can be executed by the LED display 154 and sound generation from the speaker 152 and vibrating motor 153 can be also prevented. Further, by setting the second incoming call notifying operation in a so-called silent mode in which the incoming call is informed by light emission from the LED display 154 and vibration of the vibrating motor 153, the incoming call notification by the "silent mode" can be made and influence on the surroundings by sound generation from the speaker can be avoided. During this second incoming call notifying operation, i.e. if the incoming call operation is being carried out and authentication is not established, start of the speech by the speech button may be limited.

Further, the second incoming call notifying operation can be carried out with a setting (default setting) previously installed in the above incoming call notifying unit. Thus, for example, while in a state when the owner is separated from the portable terminal device, the incoming call notification is executed by, for example, the ringtone (kind or volume of the ringtone) with the setting (default setting) previously installed, but not executed by the ringtone personally set. By such an incoming call notification, it is possible to prevent the personal information of preference of the incoming call notifying such as the ringtone personally set (kind or volume of the ringtone) from being known to others. Incidentally, the setting previously installed (default setting) refers to the setting previously installed which is used if the user does not make any manipulation or setting, which is nearly synonymous with "initial setting" or "prescribed value". Usually, it is equivalent to the initial factory default or the setting when the user has bought the product.

Figure 4:
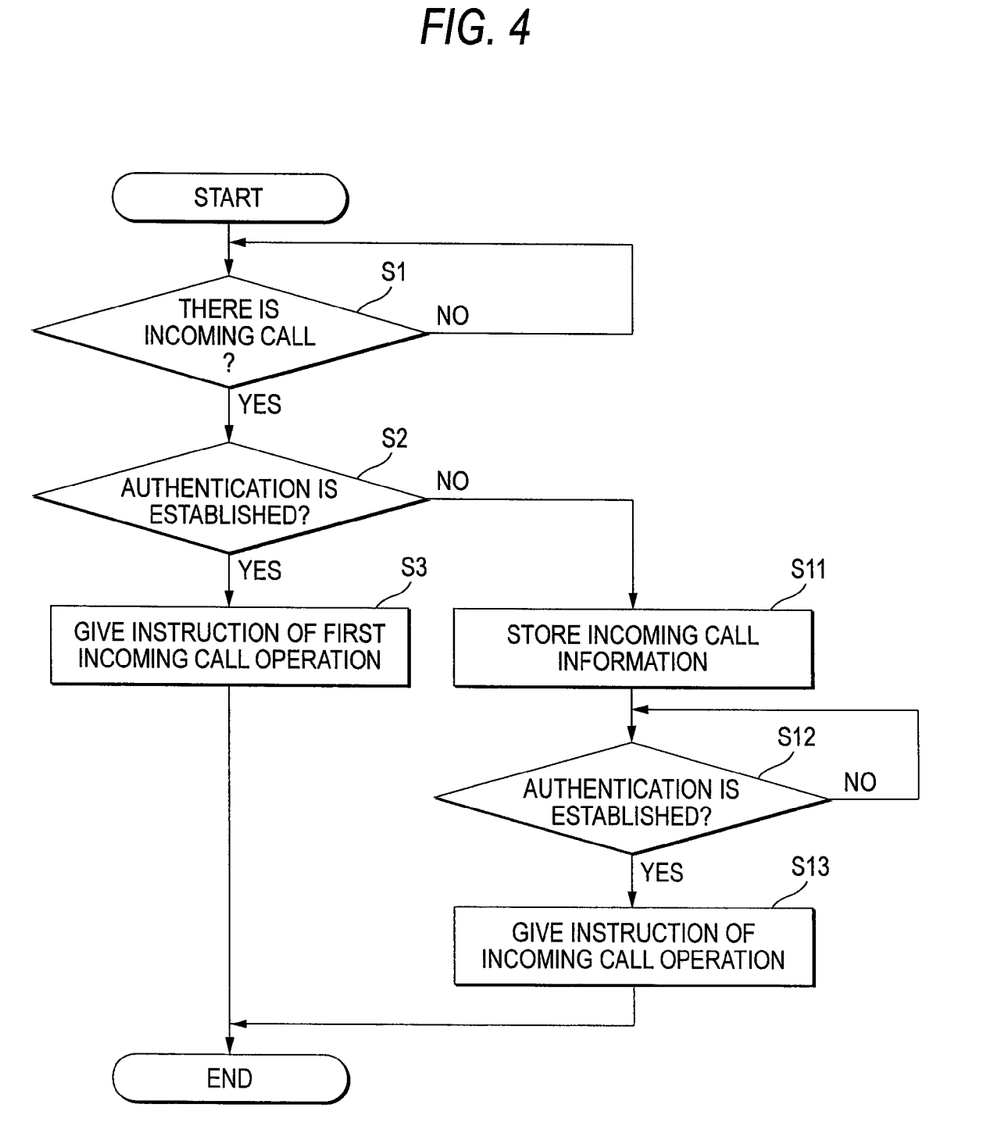
FIG. 4 is a flowchart showing a second example of the operating procedure of the portable terminal device according to an embodiment of this invention.

FIG. 4 is a flowchart showing the second example of the operation procedure of the portable terminal device according to an embodiment of this invention. In this figure, same reference symbols refer to the repeated parts of that in FIG. 3, and so the explanation is omitted.

The incoming call operation instructing unit 142, if an incoming call is detected (YES in step S1) and the authentication is not established (NO in step S2), i.e. the owner is absent, does not perform the incoming call operation but stores, in the storage unit 141, the incoming call information such as the sender information or incoming call time inputted through the data processing unit 12 as non-notified incoming call information (step S11).

The incoming call operation instructing unit 142 monitors the result of radio authentication by the determining unit 133 (step S12) and, if the establishment of authentication has been determined, i.e. the owner has come to the state approached the portable terminal device 1 from the state separated therefrom (YES in step S12), gives an instruction of notifying the incoming call to the notifying unit 15 based on the non-notified incoming call information stored in the storage unit 141. The notifying unit 15 performs the incoming call notifying operation based on the instruction (step S13). Incidentally, the incoming call notifying operation in this case may be the first incoming call notifying operation when the authentication has been established like step S3, or may be any incoming call notifying operation previously set in the storage unit 141.

In this way, the information of incoming call for which the incoming call notifying operation has not been done because the owner is absent can be informed quickly when the owner approaches the portable terminal device.

Figure 5:
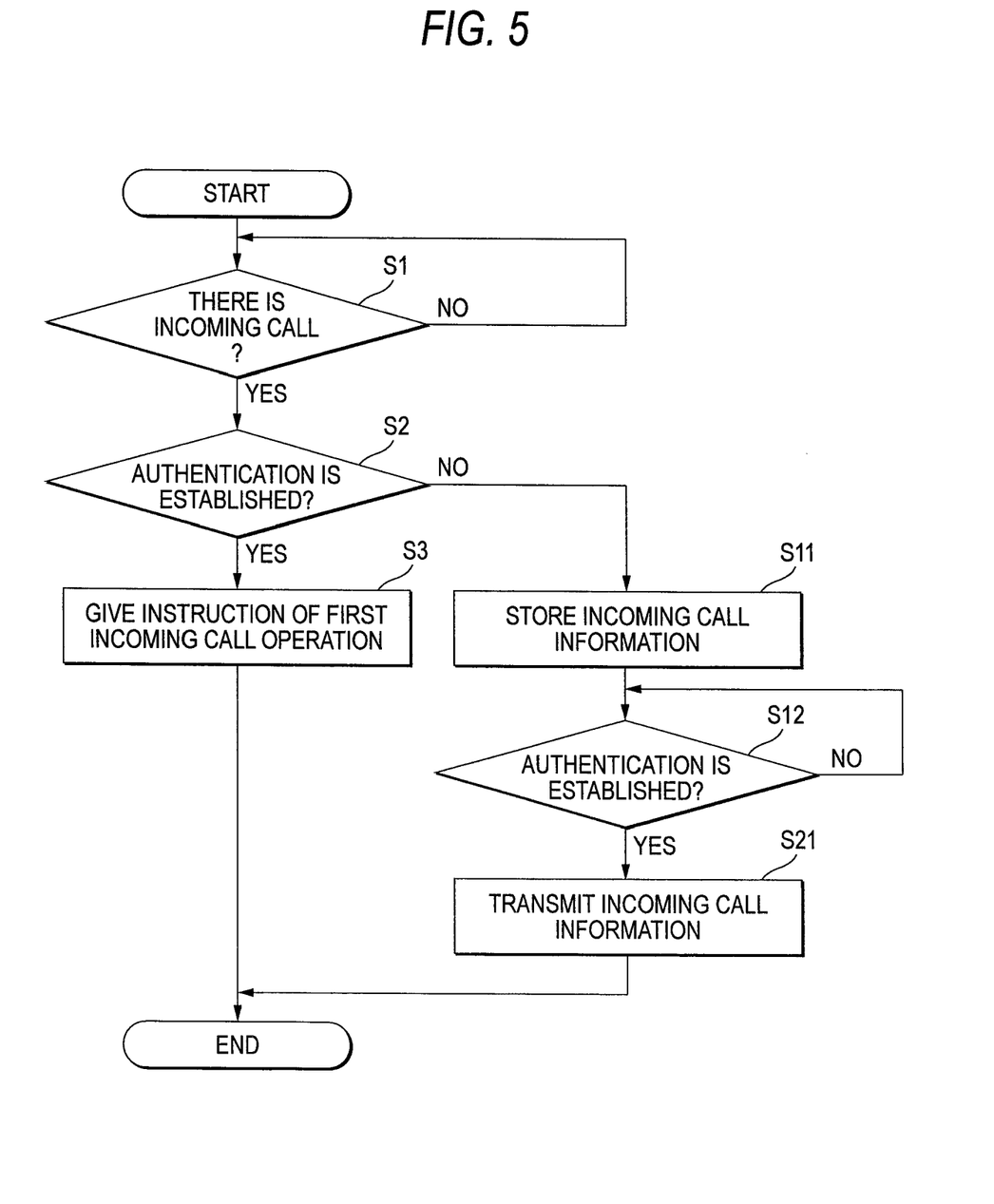
FIG. 5 is a flowchart showing a third example of the operating procedure of the portable terminal device according to an embodiment of this invention.

FIG. 5 is a flowchart showing the third example of the operation procedure of the portable terminal device according to an embodiment of this invention. In this figure, same reference symbols refer to the repeated parts in FIG. 4, and so the explanation is omitted.

The incoming call operation instructing unit 142, if an incoming call is detected (YES in step S1) and the authentication is not established (NO in step S2), stores non-notified incoming call information in the storage unit 141 (step S11). The incoming call operation instructing unit 142 monitors the result of radio authentication by the determining unit 133 (step S12) and, if the establishment of authentication has been determined, i.e. the owner has become to the state in which the owner is near the portable terminal device 1 from the state separated therefrom (YES in step S12), supplies the non-notified incoming call information stored in the storage unit 141 to the data communicating unit 134. The data communicating unit 134 transmits the non-notified incoming call information thus supplied to the radio communicating unit 3 through the radio unit 132 (step S21).

In the radio communicating unit 3, the data communicating unit 334 of the radio authenticating unit 33, when it receives the non-notified incoming call information through the radio unit 332, supplies the non-notified incoming call information received to the notifying operation controlling unit 34. The notifying operation controlling unit 34, when it receives the non-notified incoming call information, gives an instruction of the incoming call notification to the notifying unit 35. The notifying unit 15 performs the incoming call notification based on this instruction.

In this way, the radio communicating unit 3, when the owner approaches the portable terminal device 1, can acquire the information on the incoming call for which the incoming call notifying operation has not been done because the owner is absent. This incoming call is notified by the radio communicating unit 3 and so swiftly notified at a position near the owner. For example, in the case of the notification (notification by the silent mode) such as driving the vibrating motor without generating sound, the radio communicating unit carried on the clothes can more surely notify the owner of the incoming call than the portable terminal device being left and not carried does.

As understood from the description hitherto made, in accordance with a portable terminal device and its incoming call notifying operation controlling method according to the embodiment of this invention, since the incoming call notifying method is controlled according to the distance to the radio communicating unit 3, by performing different incoming call notifying operations, for example, for the states where the owner is near the portable terminal device and the owner is absent and separated therefrom, the incoming call notifying operation preventing influence on the surroundings and leakage of personal information without impairing convenience can be performed.

Additionally, the above explanation has been given of the portable terminal device performing different incoming call notifying operations with reference to establishment/non-establishment of authentication. Specifically, using the authentication distance for radio authentication, different incoming call notifying operations are performed for the cases where the distance to the radio communicating unit 3 is within the authentication distance and over the authentication distance. However, the distance which is a criterion for changing the incoming call notifying operation should not be limited to the authentication distance but may be a distance different therefrom.

In this case, the determining unit 133 of the radio authenticating unit 13 supplies, to the incoming call operation instructing unit 142, the distance information to the radio communicating unit 3 detected on the basis of the received signal received through the radio unit 132. In the storage unit 141, the distances to the radio communicating unit 3 and the incoming call notifying method are previously stored so that they are correlated with each other. The incoming call operation instructing unit 142, when the incoming call is detected, performs the processing of controlling the incoming call notifying operation referring to the storage unit 141 on the basis of the distance information supplied. Thus, the incoming call notification can be executed by the incoming call notifying method according to the distance to the radio communicating unit.

Further, as described above, there are various radio authenticating methods. Therefore, the incoming call notification can be executed by the incoming call notifying method according to the establishment/non-establishment of authentication as a result of the authentication. Although there are various authenticating methods, generally, if both devices are separated equal to or further than a predetermined distance so that the strength of their received signal is equal to or lower than a predetermined value, the authentication is not established; inversely, if both are separated within the predetermined distance, the authentication is established. Further, in this case, with setting of plural authentication distances being permitted, for example, if a short distance is set, as long as the distance therebetween is within the authentication distance but not shorter than the set distance, it is possible to inhibit the authentication (the authentication is not established). It should be noted that the distance is determined by the strength of the received signal.

Further, the setting information of the incoming call notifying operation can be optionally changed through the manipulating unit 16 by the user thereby to make desired setting. For example, using the manipulating unit 16, the distance to the radio communicating unit 3 which is a criterion for changing the incoming call notifying operation and the operation of the notifying unit 15 are specified and these items of information are stored in the storage unit 141 as the setting information through the incoming call operation instructing unit 142.

Further, the setting information such as the incoming call notifying operation of the portable terminal device 1 may be changed using the manipulating unit 36 of the radio communicating unit 3. When the data communicating unit 334 receives a manipulating input of specifying the setting of the incoming call notifying operation from the manipulating unit 36 by the user, it transmits the setting information specified by the manipulating input to the portable terminal device 1 through the radio unit 332. In the portable terminal device 1, the data communicating unit 134 of the radio authenticating unit 13 receives the setting information through the radio unit 132 and supplies it to the incoming call operation instructing unit 142. The incoming call operation instructing unit 142 stores the setting information of the incoming call notifying operation in the storage unit 141 and gives notice of setting completion to the data communicating unit 134.

The data communicating unit 134 transmits the notice of setting completion inputted to the radio communicating unit 3 through the radio unit 132. The data communicating unit 334 of the radio communicating unit 3 receives the notice of setting completion through the radio unit 332 and gives the notice of setting completion to the notifying unit 35 through the notifying operation controlling unit 34. Incidentally, in the radio communicating unit 3, the notifying operation controlling unit 34 may detect the case where the notice of setting completion is not received within a predetermined time after the setting information has been transmitted and notifies this fact through the notifying unit 35.

In this way, even where the portable terminal device 1 is put in e.g. a bag, by remote control, setting can be changed without taking out the portable terminal device 1 from the bag, the user can know without directly seeing the portable terminal device 1 that the portable terminal device 1 is operating. The user can make the setting without the exact position of the portable terminal device 1 being known by others.

This invention has been explained in detail and referring to the specific embodiment. However, it is apparent to those skilled in the art that this invention can be changed or modified in various manners without departing from the spirit and scope of the invention.

This application is based on Japanese Patent Application (Patent Application No. 2005-192260) filed on Jun. 30, 2005 and the contents thereof are incorporated herein by reference.

INDUSTRIAL APPLICABILITY

The portable terminal device and its incoming call notifying operation controlling method according to this invention has an advantage of capable of preventing influence on the surroundings and leakage of personal information without impairing convenience, and is useful to, for example, the portable terminal device connectable to, for example, a cellular communication network.

The invention claimed is:

1. A portable terminal device comprising:
a radio communicating unit which performs radio communication with a base station device;
an incoming call notifying unit which executes an incoming call notification when an incoming call is detected by the radio communicating unit;
an incoming call notifying operation controlling unit which controls operation of the incoming call notifying unit; and
a radio authenticating unit which conducts radio communication with a radio communicating device and conducts authentication for the radio communicating device in accordance with whether or not a distance to the radio communicating device is within an authentication distance,
wherein the incoming call notifying operation controlling unit limits the operation of the incoming call notification of the incoming call detected by the incoming call notifying unit when the distance to the radio communicating device is farther than the authentication distance so as to be more limited than the operation of the incoming call notification of the incoming call detected by the incoming call notifying unit when the distance to the radio communicating device is within the authentication distance,
wherein the incoming call notifying operation controlling unit does not execute incoming call notification by the incoming call notifying unit for the incoming call detected when the distance to the radio communicating device is farther than the authentication distance, and
wherein the incoming call notifying operation controlling unit includes a storage unit which stores, as non-notified incoming call information, information on the incoming call which is detected when the distance to the radio communicating device is farther than the authentication distance and for which the incoming call notification is not executed by the incoming call notifying unit.

2. The portable terminal device according to claim 1, wherein when the distance to the radio communicating device is shifted from a state of being farther than the authentication distance to a state of being within the authentication distance, the incoming call notifying operation controlling unit executes the incoming call notification by the incoming call notifying unit on the basis of the non-notified incoming call information stored in the storage unit.

3. The portable terminal device according to claim 1, wherein when the distance to the radio communicating device is shifted from a state of being farther than the authentication distance to a state of being within the authentication distance, the incoming call notifying operation controlling unit transmits the non-notified incoming call information stored in the storage unit to the radio communicating device through the radio authenticating unit.

4. The portable terminal device according to claim 1, wherein the incoming call notifying operation controlling unit executes the incoming call notification with a setting (default setting) previously installed in the incoming call notifying unit for the incoming call detected when the distance to the radio communicating device is farther than the authentication distance.

5. The portable terminal device according to claim 1, wherein the incoming call notifying operation controlling unit prevents the incoming call notifying unit from generating sound when the distance to the radio communicating device is farther than the authentication distance.

* * * * *